US008493848B2

(12) United States Patent
Matsuzawa

(10) Patent No.: US 8,493,848 B2
(45) Date of Patent: Jul. 23, 2013

(54) RESOURCE ALLOCATION METHOD IN WIRELESS BASE STATION DEVICE, AND WIRELESS BASE STATION DEVICE

(75) Inventor: Hiromu Matsuzawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 285 days.

(21) Appl. No.: 12/700,377

(22) Filed: Feb. 4, 2010

(65) Prior Publication Data

US 2010/0135260 A1 Jun. 3, 2010

Related U.S. Application Data

(63) Continuation of application No. PCT/JP2007/000883, filed on Aug. 17, 2007.

(51) Int. Cl.
H04L 12/56 (2006.01)
H04J 1/16 (2006.01)

(52) U.S. Cl.
USPC ........... 370/230; 370/252; 370/329; 370/386; 455/446; 455/452.2

(58) Field of Classification Search
USPC ................ 370/230, 252, 386, 329; 455/446, 455/452.2
See application file for complete search history.

(56) References Cited

U.S. PATENT DOCUMENTS

| 6,259,685 | B1 | 7/2001 | Rinne et al. | |
|---|---|---|---|---|
| 6,434,128 | B1 | 8/2002 | Benz et al. | |
| 7,200,407 | B1 * | 4/2007 | Smith et al. | 455/452.2 |
| 7,869,399 | B2 * | 1/2011 | Terry | 370/329 |
| 7,949,307 | B2 | 5/2011 | Ode | |
| 2002/0042275 | A1 | 4/2002 | Kitazawa et al. | |
| 2004/0097238 | A1 | 5/2004 | Hwang et al. | |
| 2007/0178928 | A1 | 8/2007 | Ode | |
| 2010/0329377 | A1 | 12/2010 | Ode | |
| 2011/0124298 | A1 | 5/2011 | Ode | |

FOREIGN PATENT DOCUMENTS

| EP | 1343282 A1 | 9/2003 |
|---|---|---|
| JP | 05030021 | 2/1993 |
| JP | 2001036950 | 2/2001 |
| JP | 2001516541 | 9/2001 |
| JP | 2004159345 | 6/2004 |
| JP | 2006050545 | 2/2006 |
| JP | 2007512754 | 5/2007 |
| JP | 2007201854 | 8/2007 |
| WO | 0072617 A1 | 11/2000 |
| WO | 2005053342 | 6/2005 |
| WO | 2008105091 | 9/2008 |

OTHER PUBLICATIONS

International Search Reprot dated Sep. 18, 2007, in corresponding International Application No. PCT/JP2007/000883.

(Continued)

*Primary Examiner* — John Pezzlo
(74) *Attorney, Agent, or Firm* — Smith, Gambrell & Russell, LLP

(57) ABSTRACT

A wireless resource allocation method, including classifying a plurality of wireless terminal devices into a first group and a second group according to wireless communication quality; and performing allocation, such that transmission time period allocated to wireless terminal device having the best wireless communication quality from among the wireless terminal devices belonging to the first group, and transmission time period allocated to the wireless terminal device having the best wireless communication quality from among the wireless terminal devices belonging to the second group, are temporally in closest proximity or overlap.

7 Claims, 11 Drawing Sheets

OTHER PUBLICATIONS

Japanese Notification of Reason for Rejection dated May 31, 2011 for application No. 2009-528880.

Extended European Search Report dated Mar. 27, 2013 received in Application No. 07790370.6-1857/2190233.

* cited by examiner

FIG.5

| t1f1 | t2f1 | t3f1 | t4f1 | t5f1 | t6f1 | t7f1 | t8f1 | t9f1 | t10f1 | t11f1 | t12f1 | t13f1 | t14f1 |
| t1f2 | t2f2 | t3f2 | t4f2 | t5f2 | t6f2 | t7f2 | t8f2 | t9f2 | t10f2 | t11f2 | t12f2 | t13f2 | t14f2 |
| t1f3 | t2f3 | t3f3 | t4f3 | t5f3 | t6f3 | t7f3 | t8f3 | t9f3 | t10f3 | t11f3 | t12f3 | t13f3 | t14f3 |
| t1f4 | t2f4 | t3f4 | t4f4 | t5f4 | t6f4 | t7f4 | t8f4 | t9f4 | t10f4 | t11f4 | t12f4 | t13f4 | t14f4 |
| t1f5 | t2f5 | t3f5 | t4f5 | t5f5 | t6f5 | t7f5 | t8f5 | t9f5 | t10f5 | t11f5 | t12f5 | t13f5 | t14f5 |
| t1f6 | t2f6 | t3f6 | t4f6 | t5f6 | t6f6 | t7f6 | t8f6 | t9f6 | t10f6 | t11f6 | t12f6 | t13f6 | t14f6 |

| 1 | 3 | 5 | 7 | 9 | 11 | 13 | 15 | 19 | 25 | 31 | 13 | 7 | 1 |
|---|---|---|---|---|----|----|----|----|----|----|----|---|---|
| 2 | 4 | 6 | 8 | 10 | 12 | 14 | 16 | 20 | 26 | 32 | 14 | 8 | 2 |
|   |   |   |   |   |    |    |    | 21 | 27 | 33 | 15 | 9 | 3 |
|   |   |   |   |   |    |    |    | 22 | 28 | 34 | 16 | 10 | 4 |
|   |   |   |   |   |    |    |    | 23 | 29 | 35 | 17 | 11 | 5 |
|   |   |   |   |   |    |    |    | 24 | 30 | 36 | 18 | 12 | 6 |

REGION T1 <= | => REGION T2

| 1 | 3 | 5 | 7 | 9 | 11 | 13 | 15 |    |    |    | 17 | 11 | 5 |
|---|---|---|---|---|----|----|----|----|----|----|----|----|---|
| 2 | 4 | 6 | 8 | 10 | 2 | 14 | 16 |    |    |    | 18 | 12 | 6 |
|   |   |   |   |   |    |    |    | 23 | 29 | 35 | 13 | 7 | 1 |
|   |   |   |   |   |    |    |    | 24 | 30 | 36 | 14 | 8 | 2 |
|   |   |   |   |   |    |    |    | 19 | 25 | 31 | 15 | 9 | 3 |
|   |   |   |   |   |    |    |    | 20 | 26 | 32 | 16 | 10 | 4 |
|   |   |   |   |   |    |    |    | 21 | 27 | 33 |    |    |   |
|   |   |   |   |   |    |    |    | 22 | 28 | 34 |    |    |   |

| 1 | 3 | 5 | 7 | 9 | 11 | 13 | 15 |    |    |    | 21 | 15 | 9 | 3 |
|---|---|---|---|---|----|----|----|----|----|----|----|----|---|---|
| 2 | 4 | 6 | 8 | 10 | 12 | 14 | 16 |    |    |    | 22 | 16 | 10 | 4 |
|   |   |   |   |   |    |    |    |    |    |    | 23 | 17 | 11 | 5 |
|   |   |   |   |   |    |    |    |    |    |    | 24 | 18 | 12 | 6 |
|   |   |   |   |   |    |    |    | 19 | 25 | 31 | 13 | 7 | 1 |
|   |   |   |   |   |    |    |    | 20 | 26 | 32 | 14 | 8 | 2 |

REGION T1 <= | => REGION T2

FIG.7A

| 1 | 3 | 5 | 7 | 9 | 11 | 13 | 15 | 17 | | | | | |
|---|---|---|---|---|----|----|----|----|---|---|---|---|---|
| 2 | 4 | 6 | 8 | 10| 12 | 14 | 16 | 18 | | | | | |
|   |   |   |   |   |    |    |    | 19 | | | | | |
|   |   |   |   |   |    |    |    | 20 | | | | | |
|   |   |   |   |   |    |    |    | 21 | | | | | |
|   |   |   |   |   |    |    |    | 22 | | | | | |

REGION T1 <= | => REGION T2

| 1 | 3 | 5 | 7 | 9 | 11 | 13 | 15 | 21 | | | | | |
|---|---|---|---|---|----|----|----|----|---|---|---|---|---|
| 2 | 4 | 6 | 8 | 10| 2  | 14 | 16 | 22 | | | | | |
|   |   |   |   |   |    |    |    | 17 | | | | | |
|   |   |   |   |   |    |    |    | 18 | | | | | |
|   |   |   |   |   |    |    |    | 19 | | | | | |
|   |   |   |   |   |    |    |    | 20 | | | | | |

|   | 3 | 5 | 7 | 9 | 11 | 13 | 15 | 19 | | | | | |
|---|---|---|---|---|----|----|----|----|---|---|---|---|---|
| 2 | 4 | 6 | 8 | 10| 12 | 14 | 16 | 20 | | | | | |
|   |   |   |   |   |    |    |    | 21 | | | | | |
|   |   |   |   |   |    |    |    | 22 | | | | | |
|   |   |   |   |   |    |    |    | 17 | | | | | |
|   |   |   |   |   |    |    |    | 18 | | | | | |

REGION T1 <= | => REGION T2

| | | | | | | | REGION T1 <= | => REGION T2 | | | | | | |
|---|---|---|---|---|---|---|---|---|---|---|---|---|---|---|
| | | | | | | | 37 | 31 | 25 | 19 | 13 | 7 | 1 |
| | | | | | | | 38 | 32 | 26 | 20 | 14 | 8 | 2 |
| | | | | | | | 39 | 33 | 27 | 21 | 15 | 9 | 3 |
| | | | | | | | 40 | 34 | 28 | 22 | 16 | 10 | 4 |
| | | | | | | | 41 | 35 | 29 | 23 | 17 | 11 | 5 |
| | | | | | | | 42 | 36 | 30 | 24 | 18 | 12 | 6 |

| | | | | | | | | | | | | | |
|---|---|---|---|---|---|---|---|---|---|---|---|---|---|
| | | | | | | | 41 | 35 | 29 | 23 | 17 | 11 | 5 |
| | | | | | | | 42 | 36 | 30 | 24 | 18 | 12 | 6 |
| | | | | | | | 37 | 31 | 25 | 19 | 13 | 7 | 1 |
| | | | | | | | 38 | 32 | 26 | 20 | 14 | 8 | 2 |
| | | | | | | | 39 | 33 | 27 | 21 | 15 | 9 | 3 |
| | | | | | | | 40 | 34 | 28 | 22 | 16 | 10 | 4 |

| | | | | | | | REGION T1 <= | => REGION T2 | | | | | | |
|---|---|---|---|---|---|---|---|---|---|---|---|---|---|---|
| | | | | | | | 39 | 33 | 27 | 21 | 15 | 9 | 3 |
| | | | | | | | 40 | 34 | 28 | 22 | 16 | 10 | 4 |
| | | | | | | | 41 | 35 | 29 | 23 | 17 | 11 | 5 |
| | | | | | | | 42 | 36 | 30 | 24 | 18 | 12 | 6 |
| | | | | | | | 37 | 31 | 25 | 19 | 13 | 7 | 1 |
| | | | | | | | 38 | 32 | 26 | 20 | 14 | 8 | 2 |

| | | | | | | REGION T1 <= | => REGION T2 | | | | |
|---|---|---|---|---|---|---|---|---|---|---|---|
| 1 | 3 | 5 | 7 | 9 | 11 | 13 | | 19 | 25 | 31 | 37 |
| 2 | 4 | 6 | 8 | 10 | 12 | Free | | 20 | 26 | 32 | 38 |
| | | | | | | | | 21 | 27 | 33 | 39 |
| | | | | | | | | 22 | 28 | 34 | 40 |
| | | | | | | | | 23 | 29 | 35 | 41 |
| | | | | | | | | 24 | 30 | 36 | 42 |

| | | | | | | REGION T1 <= | => REGION T2 | | | | |
|---|---|---|---|---|---|---|---|---|---|---|---|
| 1 | 3 | 5 | 7 | 9 | 11 | 13 | | 19 | 25 | | Free |
| 2 | 4 | 6 | 8 | 10 | 2 | 14 | | 20 | 26 | | Free |
| | | | | | | 15 | | 21 | 27 | | 17 |
| | | | | | | 16 | | 22 | 28 | | 18 |
| | | | | | | | | 23 | | | 19 Free |
| | | | | | | | | 24 | | | 20 Free |

262

RESOURCE ALLOCATION METHOD IN WIRELESS BASE STATION DEVICE, AND WIRELESS BASE STATION DEVICE

CROSS REFERENCE TO RELATED APPLICATIONS

This application is a continuation of International Application No. PCT/JP2007/000883, filed on Aug. 17, 2007, now pending, herein incorporated by reference.

TECHNICAL FIELD

The present invention relates to a resource allocation method in a wireless base station device and to a wireless base station device.

BACKGROUND ART

In the past, FDMA (Frequency Division Multiple Access), OFDMA (Orthogonal Frequency Division Multiple Access), and other communication methods have employed methods for dividing the frequencies allocated to the entire system and allocating different frequencies to adjacent cells, in order to avoid interference with adjacent cells (see for example Patent Reference 1 below). FIG. 11 explains such a method of frequency allocation. In this method, as illustrated in the figure, for example different frequencies (A to C) are respectively allocated to three cells (cell #1 to cell #3). In particular, two terminal devices positioned in different cells near the cell boundary have different frequencies, so that there are few interference problems, and high-quality communication with the respective base stations is possible.

However, there are limits to allocable frequency resources. Hence when divided frequencies are allocated to individual cells, the bandwidth allocated per cell is narrowed relative to the entire frequency bandwidth. In the example of FIG. 11, this is "⅓". Such an allocation method cannot allocate frequencies to each terminal device when numerous terminal devices exist within a cell, so that waiting for a free frequency occurs, and as a result the speed of transmission between terminal devices and base stations is degraded.

Hence in the prior art, methods have been used in which the frequency band per cell is broadened while avoiding interference with adjacent cells, to improve the speed of transmission in communication between base stations and terminal devices (see for example Patent Reference 2 below). FIG. 12A and FIG. 12B are used to explain such an example. For example, in a certain time period, frequencies allocated to a communication system as a whole are divided as illustrated in FIG. 12A, and different frequencies are allocated to adjacent cells. And, in a different time period, all frequencies of the communication system are allocated to each cell as illustrated in FIG. 12B. In this communication system, time periods are switched in alternation to perform communication.

Patent Reference 1: Japanese Patent Application Laid-open No. 2004-159345

Patent Reference 2: Japanese Patent Application No. 2007-999898

DISCLOSURE OF THE INVENTION

Problems to be Solved by the Invention

In the frequency allocation (or resource allocation) method of Patent Reference 2, time period switching is performed uniformly and simultaneously for each cell. The reason for this is that, while all frequencies are being used in communication in a certain cell (FIG. 12B), communication is being performed in an adjacent cell using a divided frequency band (FIG. 12A), terminal devices of the cell using the divided frequency band exist on the cell edge, so that this frequency from the adjacent cell using all frequencies becomes interference, and there are cases in which communication quality cannot be ensured.

However, if time period switching is performed uniformly and simultaneously in this way, there occur cases in which the resources of the entire communication system cannot be utilized effectively. For example, despite the fact that frequencies may be unused in a certain cell, frequencies may be insufficient in an adjacent cell; or, despite the fact that resources are unused in a certain time period, resources may be insufficient in another time period. Resource allocation which enables adaptive time period switching according to circumstances is desired.

When changing the switching time, a method is conceivable in which the number of allocations per time period or similar is measured, and modification is performed based on the statistical data. However, in this method the switching time is calculated based on statistical data, but fluctuations in traffic (communication amounts) which change in realtime cannot be followed.

A method is also conceivable in which information is exchanged between cells to check whether resources are free, insufficient, or similar, and arbitration is performed. However, in such a method it is necessary to rapidly exchange information between cells, and moreover when the number of cells is large, arbitration increases without limit, so that actual implementation is difficult. A method is desired in which cells allocate resources autonomously, without the performance of arbitration between cells.

The present invention was devised in light of the above problems, and has as an object the provision of a resource allocation method and a base station device enabling adaptive switching of time periods according to circumstances.

A further object of the invention is to provide a resource allocation method and similar in which each cell allocates resources autonomously.

Means for Solving the Problem

A wireless resource allocation method, including classifying a plurality of wireless terminal devices into a first group and a second group according to wireless communication quality; and performing allocation, such that transmission time period allocated to wireless terminal device having the best wireless communication quality from among the wireless terminal devices belonging to the first group, and transmission time period allocated to the wireless terminal device having the best wireless communication quality from among the wireless terminal devices belonging to the second group, are temporally in closest proximity or overlap.

A wireless base station, including a classification unit which classifies a plurality of wireless terminal devices into a first group and a second group according to wireless communication quality; and an allocation unit which performs allocation such that transmission time period allocated to wireless terminal device having the best wireless communication quality from among the wireless terminal devices belonging to the first group, and transmission time period allocated to the wireless terminal device having the best wireless communication quality from among the wireless terminal devices belonging to the second group, are temporally in closest proximity or overlap.

Advantageous Effect of the Invention

By means of the present invention, a resource allocation method in a base station device capable of adaptively switching time periods according to circumstances, as well as a base station device, can be provided. Further, by means of the present invention, a resource allocation method and similar enabling each cell to allocate resources autonomously can be provided.

BRIEF DESCRIPTION OF THE DRAWINGS

FIG. 5 depicts an example of resource numbers common to all cells;
FIG. 6A through FIG. 6C depict examples of the order of allocation of resources to each cell;
FIG. 7A through FIG. 7C depict examples of intrusion order when resources are insufficient;
FIG. 8A through FIG. 8C depict examples of intrusion order when resources are insufficient;
FIG. 9A through FIG. 9D depict examples of resource allocation;
FIG. 10A and FIG. 10B depict resource allocation.

EXPLANATION OF LETTERS OR NUMERALS

1: Mobile Communication System
10: Terminal Device
20(20-1~20-n): Wireless Base Station Device
22: Wireless Transmission/Reception Portion
23: Measurement Portion
24: Control Portion
25: Wire Connection Portion
26: Storage Portion
27: Wireless Quality-Based MS Order Assignment Portion (Order Assignment Portion)
28: Transmission Data Order Rearrangement Portion (Order Rearrangement Portion)
29: Allocation Pattern Judgment Portion
30: Allocation Pattern Judgment Threshold Setting Portion
31: Intrusion Permission MS Wireless Quality Threshold Setting Portion
32: Intrusion Permission Resource Number Limit Threshold Setting Portion
40-1~40-m:
60: Communication Network

BEST MODE FOR CARRYING OUT THE INVENTION

Optimal embodiments for implementing the invention are described below.

Figure 1:
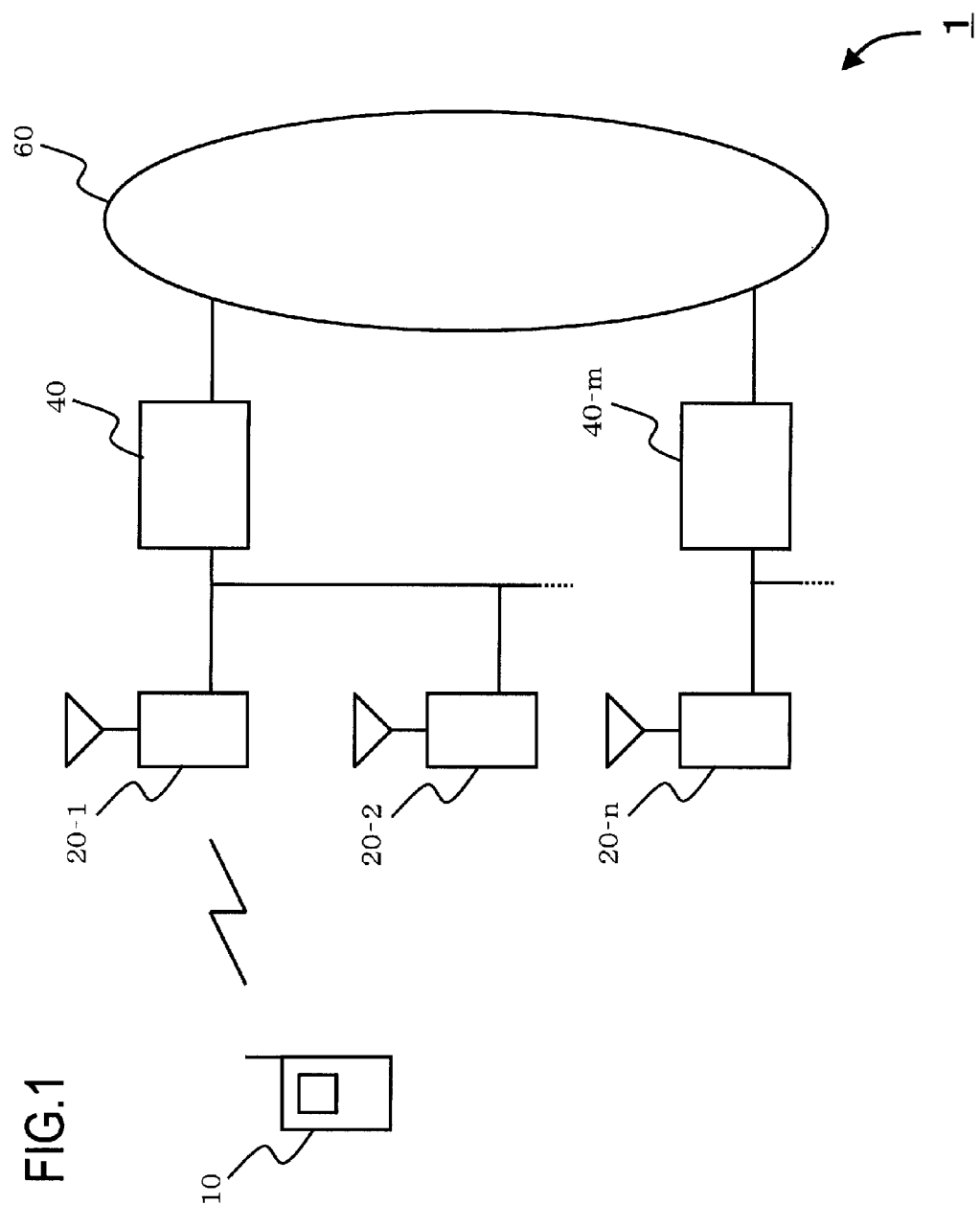
FIG. 1 depicts an example of the configuration of a communication system.

FIG. 1 depicts an example of the configuration of a mobile communication system 1. The mobile communication system 1 comprises a terminal device 10, wireless base station devices 20-1 to 20-n, network connection devices 40-1 to 40-m, and a communication network 60.

The terminal device 10 communicates, via the wireless base station devices 20-1 to 20-n, with other terminal devices 10 and with servers or similar connected to the communication network 60, while moving among cells within range enabling communication with the wireless base station devices 20-1 to 20-n. The terminal device 10 is for example a portable telephone set, a PDA (Personal Digital Assistant), or another portable information terminal.

The wireless base station devices 20-1 to 20-n are positioned between the terminal device 10 and the network connection devices 40-1 to 40-n, and perform conversion and relaying between wireless circuits and wire circuits, circuit management, communication control, and similar. Details are described below.

The network connection devices 40-1 to 40-m provide an interface between the communication network 60 and the wireless base station devices 20-1 to 20-n, and manage the states of wire circuits, terminal devices 10 and similar.

Figure 2:
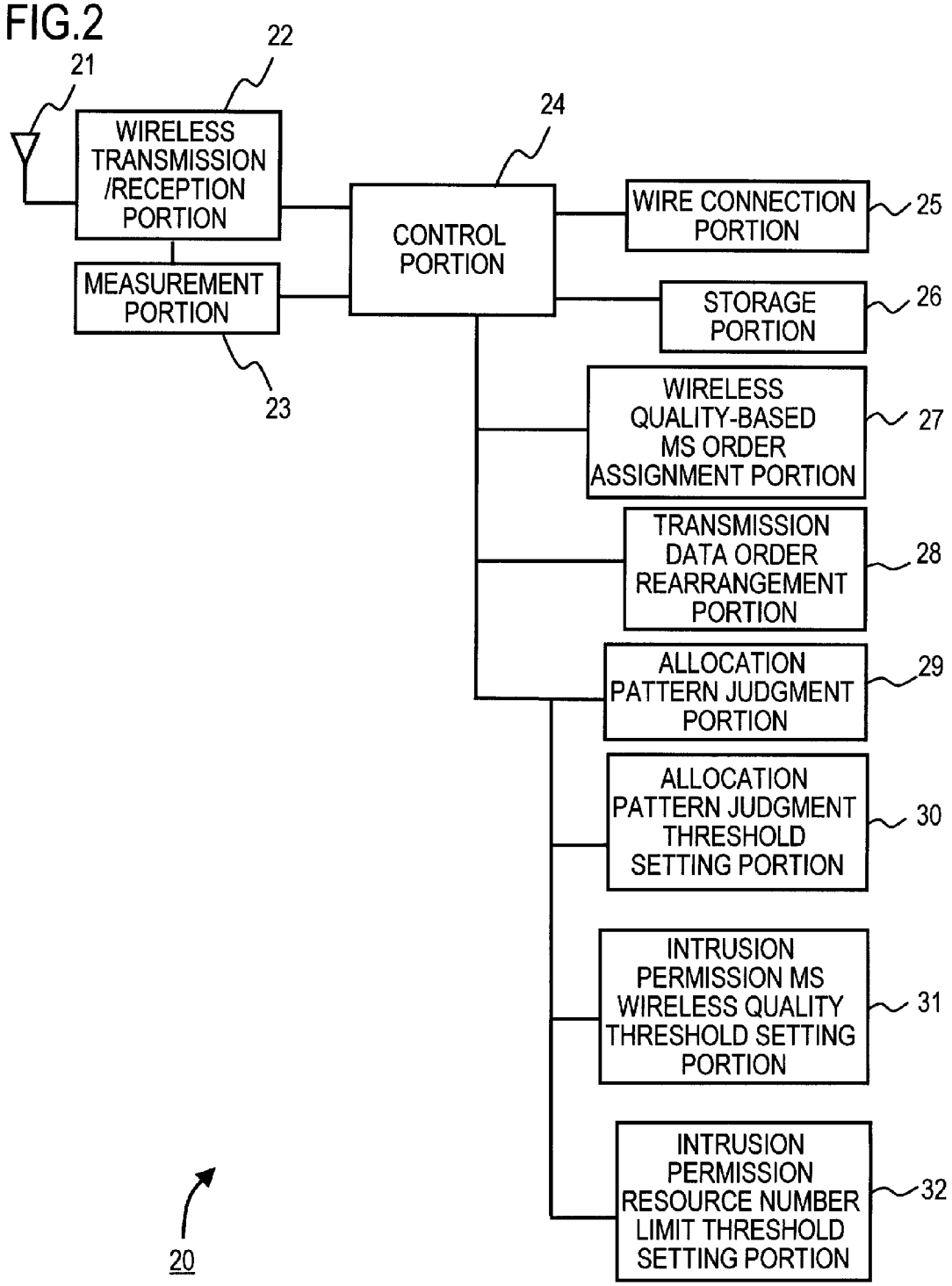
FIG. 2 depicts an example of the configuration of a base station device.

FIG. 2 depicts an example of the configuration of the wireless base station devices 20-1 to 20-n (hereafter called wireless base station devices 20). A wireless base station device 20 comprises an antenna 21, wireless transmission/reception portion 22, measurement portion 23, control portion 24, wire connection portion 25, storage portion 26, wireless quality-based MS order assignment portion 27, transmission data order rearrangement portion 28, allocation pattern judgment portion 29, allocation pattern judgment threshold setting portion 30, intrusion permission MS wireless quality threshold setting portion 31, and intrusion permission resource number limit threshold setting portion 32.

The wireless transmission/reception portion 22 converts data from the wire connection portion 25 into wireless signals which are output to the terminal device 10 via the antenna 21, and converts wireless signals received by the antenna 21 into a fixed data format, outputting the result to the control portion 24 and measurement portion 23.

In order to measure the wireless quality of the terminal device 10, the measurement portion 23 temporarily stores wireless quality information (the reception quality of signals received from the wireless base station device, measured at the terminal device) transmitted from the terminal device 10. Wireless quality may for example be indicated by the SIR (Signal to Interference Ratio), SNR (Signal to Noise Ratio), or other parameters, but in this practical example, the SINR (Signal to Interference and Noise Ratio) is used. Of course, the SIR or SNR may be used as well. The measurement portion 23 can also measure the reception quality of signals received from the terminal device, and use the result as wireless quality information.

The control portion 24 is connected with each of the portions 22 to 32, from the wireless transmission/reception portion 22 to the intrusion permission resource number limit threshold setting portion 32, and executes control of these portions.

The wire connection portion 25 is connected to the network connection devices 40-1 to 40-m, and outputs data and similar from the wireless transmission/reception portion 22 to the network connection devices 40-1 to 40-m, and outputs data and similar from the network connection devices 40-1 to 40-m to the control portion 24.

The storage portion 26 stores a resource allocation table, indicating resource allocation order for each terminal device 10, and other tables and threshold values. Details are described below.

The wireless quality-based MS order assignment portion (hereafter "order assignment portion") 27 references the resource allocation table or similar stored in the storage portion 26 based on wireless quality collected by the measurement portion 23, and performs processing for resource allocation to terminal devices 10 in a specified order.

The transmission data order rearrangement portion (hereafter "order rearrangement portion") 28 performs processing to arrange each subordinate terminal device 10, in the order of poor wireless quality, using collected wireless quality information.

The allocation pattern judgment portion 29 compares wireless quality for each terminal device 10 with a wireless quality threshold, and performs allocation pattern decision and other processing. Details of the order assignment portion 27, order rearrangement portion 28, and allocation pattern judgment portion 29 are described below.

The allocation pattern judgment threshold setting portion 30 sets the threshold for wireless quality (hereafter "wireless quality threshold") used by the allocation pattern judgment portion 29. The wireless quality threshold thus set is stored in the storage portion 26.

The intrusion permission MS wireless quality threshold setting portion 31 sets the intrusion permission MS wireless quality threshold (hereafter "permitted quality threshold") used by the order assignment portion 27. The permitted quality threshold thus set is stored in the storage portion 26.

Further, the intrusion permission resource number limit threshold setting portion 32 sets the intrusion permission resource number limit threshold (hereafter "number quality threshold") used by the order assignment portion 27. The number quality threshold thus set is stored in the storage portion 26.

Figure 3:
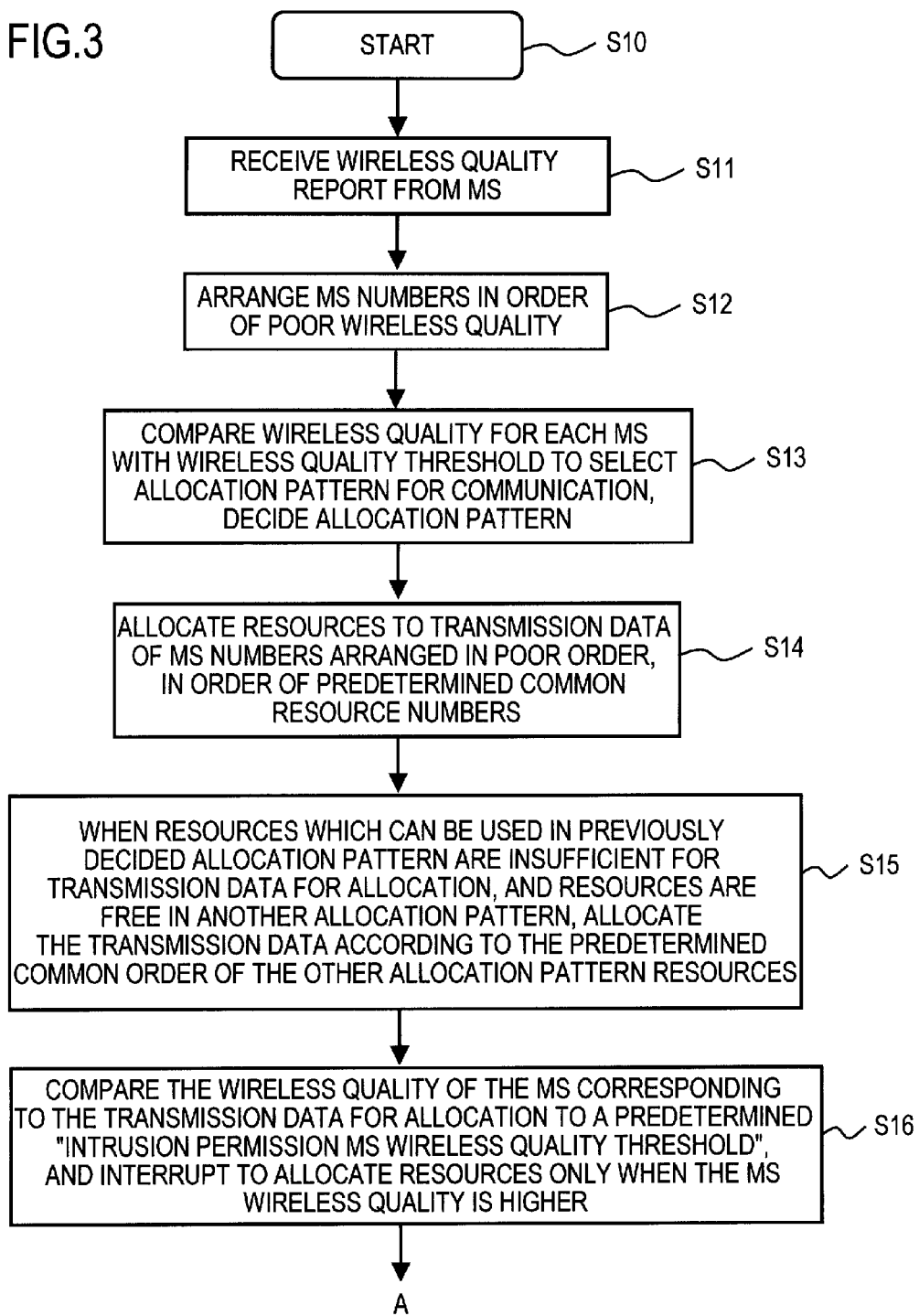
FIG. 3 is a flowchart depicting an example of resource allocation processing.
Figure 4:
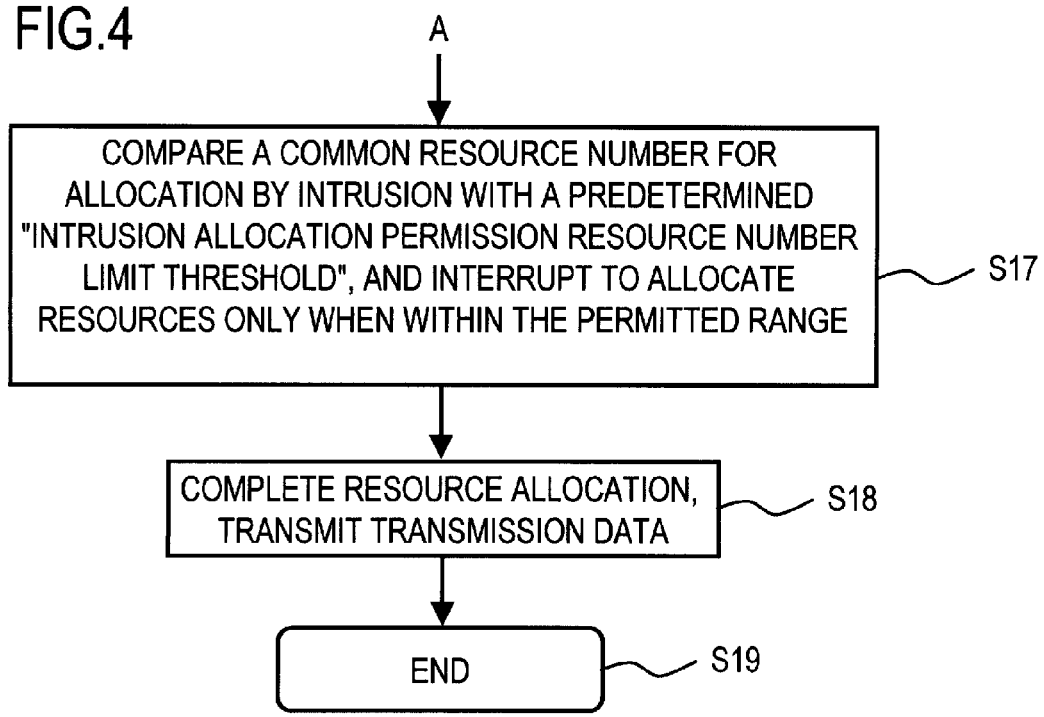
FIG. 4 is a flowchart depicting an example of resource allocation processing.

Next, operations in a wireless base station device 20 configured in this way are explained. FIG. 3 and FIG. 4 are flowcharts depicting examples of resource allocation processing operations executed by the wireless base station device 20.

First, when the wireless base station device 20 begins this processing (S10), the wireless transmission/reception portion 22 receives wireless quality information transmitted from the terminal device 10 (S11). The wireless transmission/reception portion 22 outputs the received wireless quality information to the measurement portion 23. The wireless transmission/reception portion 22 also receives identification information for each terminal device 10 together with wireless quality information. The measurement portion 23 receives wireless quality information for all terminal devices 10 subordinate to the wireless base station device 20.

Next, the order rearrangement portion 28 arranges the terminal devices 10 in the order of poor wireless quality, using the collected wireless quality information (S12). The order rearrangement portion 28 acquires the collected wireless quality information from the measurement portion 23 via the control portion 24, performs arrangement in the order of poor wireless quality, and stores the arrangement in the storage portion 26.

Next, the allocation pattern judgment portion 29 reads out the wireless quality threshold stored in the storage portion 26 and the wireless quality information for each terminal device 10 stored in the storage portion 26, compares the wireless quality threshold with the wireless quality information, and decides on an allocation pattern (S13).

FIG. 5 is an example of a resource allocation table 260 of a wireless base station device 20, stored in the storage portion 26. In the figure, the horizontal axis represents time and the vertical axis represents frequency. As explained below, the order assignment portion 27 performs resource allocation by storing the numbers of terminal devices 10 in the resource allocation table 260.

Figure 12A:
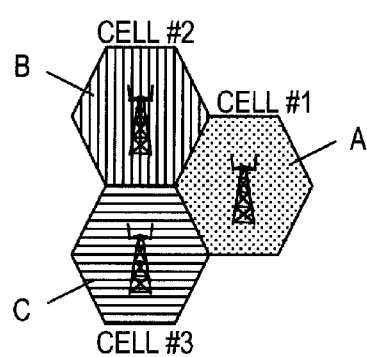
Figure 12B:
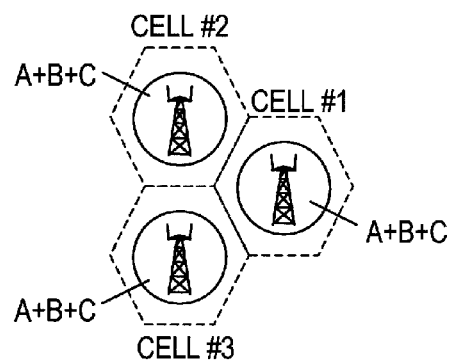

The wireless base station device 20 uses divided frequency bands in each of the cells in time period T1 (FIG. 12A), and uses a plurality of frequencies (for example, all frequencies) in each of the cells in time period T2 (FIG. 12B).

For example, the wireless base station device of cell #1 in FIG. 12A and FIG. 12B uses f1 and f2 in T1, for example, and uses f1 to f6 in T2. And, the wireless base station device of cell #2 uses f3 and f4, for example, in T1, and uses f1 to f6 in T2. And, the wireless base station device of cell #3 uses f5 and f6, for example in T1, and uses f1 to f6 in T2.

As an example, T1 and T2 may each be times of transmission of signals in the uplink direction; a terminal device to which t1f1 is allocated in region T1 performs transmission at f1 in slot t1, and a terminal device to which t9f1 is allocated in region T2 performs transmission at f1 in slot t9.

Here, the transmission power can be made the same among terminal devices, but it is preferable that the transmission power be made lower when quality is better, and higher when quality is poorer, based on wireless quality information. Terminal device transmission power can for example be specified by the wireless base station together with specification of transmission regions.

For example, the allocation pattern judgment portion 29 allocates a region in the time period T2 to a terminal device 10 having higher wireless quality information with a higher value than the wireless quality threshold, and allocates a region in the time period T1 to a terminal device 10 having wireless quality information with a lower value than the wireless quality threshold. This wireless quality threshold is a threshold value which determines whether to allocate resources in time period T1 or resources in time period T2 to a terminal device 10.

Hence regions in time period T2 of the resource allocation table 260 are allocated to terminal devices 10 with good communication quality (wireless quality information higher than the wireless quality threshold), that is, which are close to the wireless base station device 20, and regions in time period T1 are allocated to terminal devices 10 with poor quality (wireless quality information lower than the wireless quality threshold), that is, which are distant from the wireless base station device 20 and close to a cell boundary.

The boundary between the time period T1 and the time period T2 in FIG. 5 indicates the switching time; at switching times, the time period T1 and time period T2 are switched in alternation. However, as explained below, each wireless base station device 20 autonomously performs resource allocation according to circumstances, and changes the switching time.

Returning to FIG. 3, next the order assignment portion 27 performs allocation of transmission data of the numbers of terminal devices 10 arranged in order of poor quality, in accordance with the specified common resource number order (S14).

FIG. 6A through FIG. 6C depict examples of tables indicating the order of resource allocation (hereafter, "order tables") 261 to 263. FIG. 6A through FIG. 6C correspond to the cells #1 to #3 in FIG. 12A and FIG. 12B.

The numbers in the order tables 261 to 263 indicate the order in which resources are allocated. In the region T1 and the region T2, terminal devices 10 with good quality are allocated resources in the region T2 and terminal devices 10 with poor quality are allocated resources in the region T1 in the processing of S13, so that quality is poorest for number "1" in region T1. The terminal device 10 with the best quality is allocated number "36" in region T2. That is, a terminal device with poor quality is allocated a time period as far as possible from the start of region T2 (slot t1, or slots t1 to t3, or similar), and a terminal with good quality is positioned in a time period as close as possible to the side of region T1 (slot t9, or slots t9 to t12, or similar).

For example, order tables 261 to 263 are stored in the storage portion 26, and the order assignment portion 27 reads out the tables 261 to 263 from the storage portion 26, and allocates resources by writing information for each terminal device 10 in the number order into the resource allocation table 260.

Figure 11:
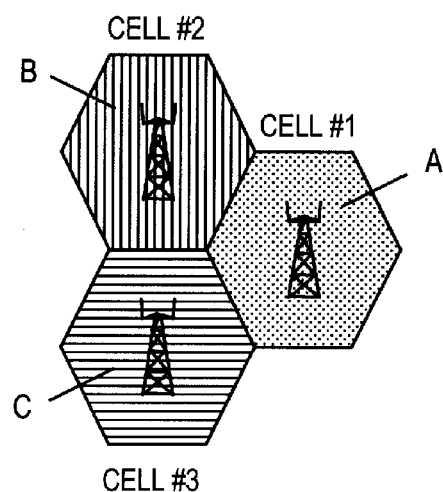
FIG. 11 depicts an example of frequency allocation of the prior art; and,
FIG. 12A and FIG. 12B depict an example of frequency allocation of the prior art.

In this practical example, as depicted in FIG. 11 and similar, all cells comprise three types of cell (cell #1 to cell #3), and each cell has a hexagonal cell range (six sector regions). FIG. 6A through FIG. 6C depict examples of each of the order tables 261 to 263 of each of the wireless base station devices 20 (wireless base station devices 20-1 to 20-3) having the respective cells #1 to #3.

Returning to FIG. 3, next, when resources which can be used in the allocation pattern previously assigned to transmission data to which resources are to be allocated are insufficient, and when there are free resources in another allocation pattern, the order assignment portion 27 performs allocation for the transmission data according to the specified common order (S15). That is, the order assignment portion 27 implement interruption in the region T1 or the region T2 and allocates resources when the resources allocated to a terminal device 10 are insufficient.

FIG. 7A through FIG. 7C are examples of order tables 261 to 263 comprising a common order, and depict an order example when resources allocated to a terminal device 10 in the time period T1 (region T1) are insufficient, and intrusion is used to allocate resources. The "common order" is the order of the region in which there is intrusion in region T1 or elsewhere. Hence each wireless base station device 20 effectively switches the time period T1 and the time period T2 at the time of intrusion based on each of the order tables 261 to 263.

That is, a terminal device with relatively poor wireless communication quality (a terminal device belonging to group 1) is permitted to receive allocation of an uplink transmission region in the range from slot t1 to slot t8, but when the allocation region becomes insufficient, allocation is performed using slot t9 as well. The frequency used at this time can be limited to f1 and f2 in the case of FIG. 7A; here, however, use of f1 to f6 is permitted. Among terminal devices belonging to group 1, those with relatively good wireless communication quality are positioned in the intrusion time period.

FIG. 8A through FIG. 8C depict order examples for a case in which resources to allocate to terminal devices 10 are insufficient in the time period T2 (region T2), and the time period T1 (region T1) is interrupted to allocate resources. If resources are insufficient in the time period T2, and there are free resources in the time period T1, the order assignment portion 27 allocates resources in the interrupted region according to the "common order".

That is, wireless terminals for which the wireless communication quality is relatively good (wireless terminals belonging to group 2) are permitted to receive allocations of uplink transmission regions in the range from slot t9 to slot t14, but when allocation regions become insufficient, slot t8 is also used to perform allocation. At this time, the frequencies used are limited to f1 and f2 in the case of FIG. 8A, but here, use of f1 to f6 is permitted. Of the wireless terminals belonging to group 2, terminals for which the wireless communication quality is relatively good are arranged in an interrupted time period.

In other words, a plurality of wireless terminal devices are classified into a first group and a second group according to the quality of wireless communication, and the transmission time period allocated to the wireless terminal device with the best wireless communication quality among the wireless terminal devices classified into the first group, and the transmission time period allocated to the wireless terminal device with the best wireless communication quality among the wireless terminal devices belonging to the second group, are allocated so as to be in closest temporal proximity or so as to overlap.

As explained above, a terminal device 10 to which resources have been allocated with an intrusion has a high resource number, and communication quality is relatively good. For example, in the example depicted in FIG. 7A, the terminal device 10 to which the region T1 numbers "17" through "22" have been allocated has good communication quality compared with the other terminal devices 10 allocated resources in region T1, and so exists in a location close to the wireless base station device 20 compared with the other terminal devices 10. Hence because the communication quality is good, few problems result from intrusion and resource allocation. That is, this is because the terminal device exists in a place comparatively close to the cell center in the region T1, the distance from adjacent cells imparting interference is large, and so the degree of influence by the interference is small, and even when interference increases the quality is comparatively good, so that robustness with respect to interference is also considerable.

It is preferable that the transmission power of wireless terminal devices be controlled according to the wireless communication quality. That is, control is executed such that the better the wireless communication quality of a wireless terminal device, the lower the transmission power, and the poorer the wireless communication quality, the higher the transmission power.

In this way, if resources are insufficient in region T1 (or in region T2) and there are free resources in region T2 (or in region T1), a wireless base station device 20 in this practical example can interrupt in region T2 (or region T1) and allocate resources to the terminal device 10. And, each wireless base station device 20 switches between the time period T1 and the time period T2 at the intrusion switching time. Hence each wireless base station device 20 can adaptively modify the switching time according to circumstances.

However, with respect to such resource interruption, when resources are allocated without any limitation of interruption, resources are allocated even to devices which do not satisfy communication quality, hence in some cases resources are wasted.

Figures 9A, 9B, 9C, 9D:
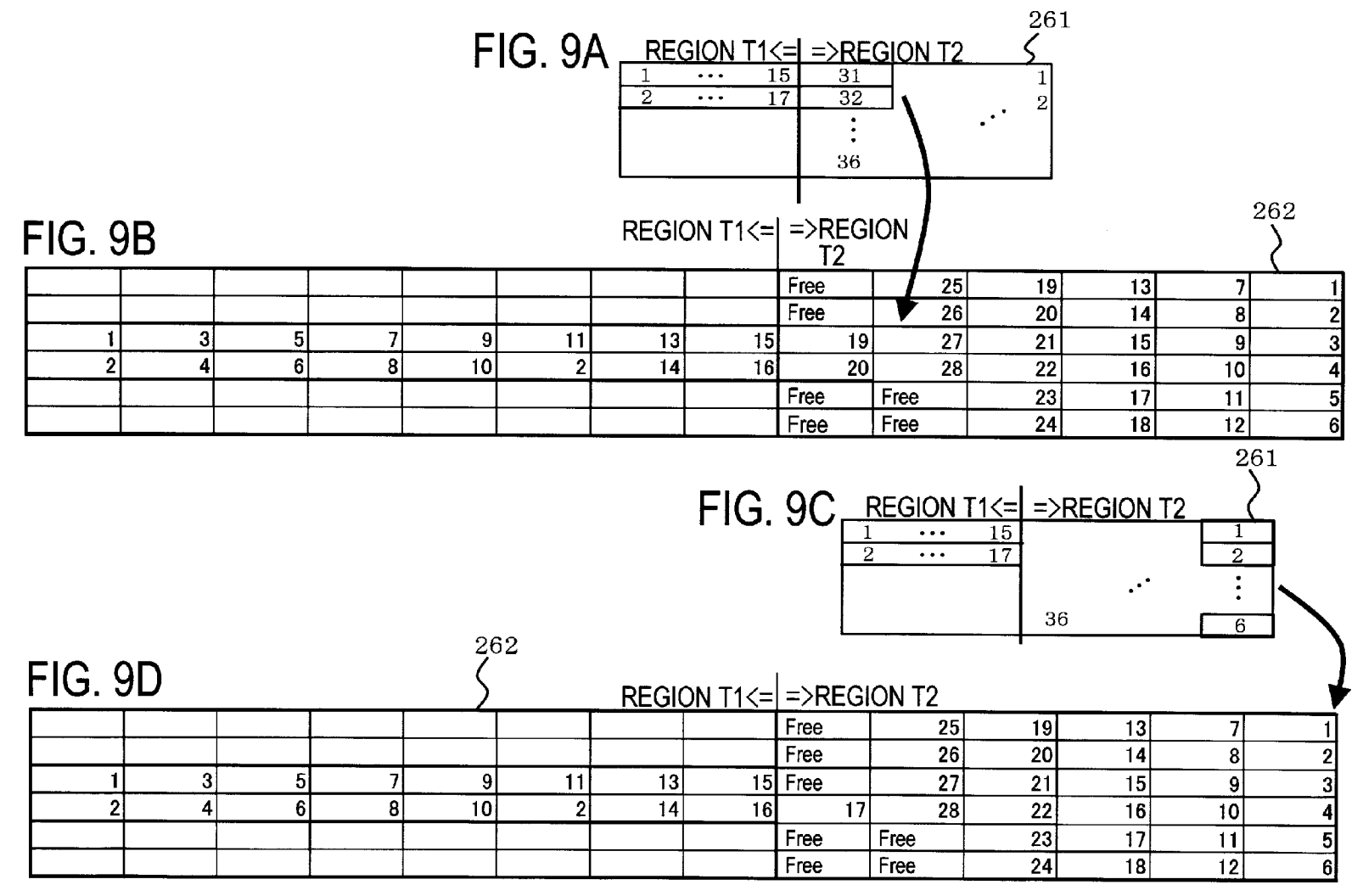

For example, when intrusion is performed and resources are allocated to terminal device 10, there is the possibility that resources at the same frequency are simultaneously being used in an adjacent cell, and interference occurs due to the same frequency from the adjacent cell, so that quality cannot be ensured. This situation is illustrated in FIG. 9A and FIG. 9B. The terminal devices 10 of numbers "19" and "20" to which resources are allocated by intrusion in region T2 of cell #2 are for example affected by this interference due to frequency when terminal devices 10 to which "t9f3" and "t9f4" are allocated in region T2 of the adjacent cell #1.

Hence the wireless base station device 20 decides on a "permitted quality threshold", and provides resources through intrusion only to terminal devices 10 satisfying this threshold (S16 in FIG. 3). That is, the order assignment portion 27 compares the wireless quality of the terminal device 10 corresponding to transmission data for allocation with the specified "permitted quality threshold", and performs intrusion to allocate resources only when the wireless quality of the terminal device 10 is high.

For example, as depicted in FIG. 9B, the order assignment portion 27 attempts to interrupt in region T2 and allocate resources to the terminal devices 10 of "17" and "18" in region T1 due to insufficient resources, but because the quality is lower than the permitted quality threshold, resource allocation is not performed. This occurs for example when the permitted quality threshold is set to "10 dB", the quality of the terminal device 10 the order of which is number "17" is "8 dB", the quality of the terminal device 10 with number "18" is "9 dB", the value for number "19" is "11 dB", and the value for number "20" is "15 dB".

The example of FIG. 9B is an example in which there is intrusion from region T1 into region T2 for resource allocation; but there may also be intrusion from region T2 into region T1 for resource allocation.

That is, when free resources exist in region T1 and resources are insufficient in region T2, intrusion occurs in the order depicted in FIG. 8A through FIG. 8C. In this case, in an adjacent cell in region T1 into which intrusion occurs, the quality of a terminal device to which a resource number is allocated through this intrusion is relative good within the region T1. That is, in the region T1 the terminal device exists at a position comparatively close to the cell center, and so the distance from the adjacent cell imparting interference is large, so that the degree of influence of the interference is small, and moreover the quality is already relatively high, so that robustness with respect to interference is considerable. Further, the terminal device in region T2 which is interrupting is a terminal existing at a position close to the cell center in region T2 as well, so that the transmission power is comparatively low, and the extent to which interference is imparted is low. Hence the intrusion and provision of resources results in few problems.

On the other hand, in the case in which a terminal in region T1 interrupts in region T2 in FIG. 9A through FIG. 9D, from the side of the interrupted region T2, each of the terminal devices 10 of region T2 in the adjacent cell imparts interference to the terminal device 10 in region T1 to which resources have been provided through intrusion. In the example of FIG. 9A, the terminal devices 10 to which numbers "1" to "6" have been allocated in region T2 of cell #1 have poor communication quality compared with the terminal devices 10 of the other numbers "7" to "12" or similar, and are distant from the wireless base station device 20, so that the communication power of the wireless base station device 20 also increases. Hence the terminal devices 10 of numbers "1" to "6" in region T2 of cell #1 readily impart interference to the adjacent cell compared with other devices.

FIG. 9C and FIG. 9D explain this example; for example, cell #1 imparts interference to terminal devices 10 to which resources have been allocated by intrusion into numbers "1" to "6" of region T2 in cell #2.

The "number quality threshold" is a permission value indicating the extent to which intrusion should be performed, or in other words, from the side imparting interference, to what extent interference is minimal and does not pose a problem for communication quality. Intrusion of resource numbers satisfying this "number quality threshold" is permitted, and intrusion of resource numbers larger than this is not permitted (S17 in FIG. 4). That is, the order assignment portion 27 compares the common resource number which is to be allocated by intrusion with the specified "number permission threshold", and allocates resources by intrusion only within the permitted range. The order assignment portion 27 reads out the "number permission threshold" stored in the storage portion 26, compares this with the identifier number of the terminal device 10 for which there is to be intrusion, and when the number is equal to or greater than the "number permission threshold", permits intrusion and resource allocation.

When considering this "number permission threshold" from another perspective, from the side imparting interference, whatever the quality of the terminal device 10 of the intrusion, interference is imparted. Hence the "number permission threshold" can also be thought of as indicating the number of terminal devices 10 for which intrusion is permitted. In the above-described example, while of course quality is better for the number "18" than for the number "17", this value is useful from the standpoint of simplifying processing by deciding the number of intrusions permitted and performing allocation in order.

Conversely, when a terminal device originally in region T2 interrupts in region T1 as in FIG. 8A through FIG. 8C, if intrusion into resource numbers of the interrupted region T1 is without limit, the probability that intrusion will continue until the position of a terminal number for which quality is quite poor becomes high. Hence it is similarly conceivable that a certain number may be stipulated to limit intrusion.

Returning to FIG. 3, the wireless base station device 20 completes resource allocation, and based on the allocated resources, transmits transmission data from the wireless transmission/reception portion 22 (S18), and ends the series of processing (S19). The control portion 24 controls the wireless transmission/reception portion 22 according to the resource allocation table 260 stored in the storage portion 26, to transmit and receive data between the wireless transmission/reception portion 22 and the terminal device 10. Switching between the time period T1 and the time period T2 is performed by the control portion 24.

FIG. 10A and FIG. 10B depict an example of resource allocation executed according to the above-described flowchart. Both depict examples of a resource allocation table 260.

As depicted in FIG. 10A, when resources in region T2 are insufficient and resources in region T1 are free, there is intrusion into region T1 and allocation of resources to terminal devices to which resources of region T2 are allocated. In FIG. 10B, conversely, there is intrusion into region T2 to allocate resources to terminal devices of region T1.

Thus it is seen that in mutually adjacent cells #1 and #2, when distributing the resources of terminal devices by executing allocation independently for each cell, the number 37 to number 42 terminal devices which should originally be allocated resources in the T2 region in cell #1 are allocated the T1 region, and in particular there is overlapping, on both the time axis and the frequency axis, with the number 15 and number 16 terminal devices, to which resources should be allocated in the time region T1, which is the time period in which different frequencies are originally allocated in the adjacent cell #2 of the number 39 and number 40 terminal devices. When performing intrusion without employing the above practical example, the number 15 and number 16 terminal devices of cell #2 receive interference from the number 39 and number 40 terminal devices of cell #1, and quality is expected to be degraded; but by employing the above practical example, number 15 and number 16 of cell #2 are terminal devices which are robust with respect to interference in the time region T1 of cell #2, and the interrupting number 39 and number 40 terminal devices of cell #1 are terminal devices positioned at the cell center, and so are terminal devices which contribute little to interference, so that there is seen to be a high probability that no problems will arise. And in cell #2, when the number 17 through number 20 terminal devices interrupting in region T2 interrupt without using the above practical example, the number 33 through number 36 terminal devices of the adjacent cell #1 receive interference and quality becomes a problem; but when using this practical example, the number 33 through number 36 terminal devices of cell #1 are positioned near the cell center, and are terminal devices which contribute little to interference, and so it is seen that problems will not tend to occur.

In the above, examples have been explained in which frequencies are allocated to different cells using three frequencies in time period T1 (FIG. 12A and similar). In time period T1, if different frequencies are used in adjacent cells, then not only three types, but various numbers of frequencies may be used, according to the cell circumstances.

The invention claimed is:

1. A wireless resource allocation method in a wireless base station, comprising:
   classifying a plurality of wireless terminal devices into a first group and a second group according to wireless communication quality, by the wireless base station; and
   performing allocation, such that transmission time period allocated to wireless terminal device having the best wireless communication quality from among the wireless terminal devices belonging to the first group, and transmission time period allocated to the wireless terminal device having the best wireless communication quality from among the wireless terminal devices belonging to the second group, are temporally in closest proximity or overlap, by the wireless base station.

2. The resource allocation method according to claim 1, wherein
   the wireless base station device allocates resource to the terminal device in accordance with order corresponding to wireless quality collected from the terminal device, and
   the wireless quality of the terminal device to which the resource is allocated by interruption in the second time period or the first time period is high in comparison with the wireless quality of the terminal device to which the resources is allocated without interruption.

3. The resource allocation method according to claim 2, wherein
   a permission number is stored in advance in a storage portion of the wireless base station device, and
   the wireless base station device reads out and compares the permission number with a number based on the order, and does not implement interruption and allocation of the resource for the terminal device having the permission number or a higher number.

4. The resource allocation method according to claim 1, wherein, if the resource is allocated to the terminal device by interruption in the second time period or in the first time period, the wireless base station device allocates the resource by interruption only for the terminal device having the wireless quality equal to or greater than permitted quality.

5. The resource allocation method according to claim 1, wherein, if the resource is allocated to the terminal device by interruption in the second time period or in the first time period, the wireless base station device does not implement interruption and allocation of the resource for the terminal device having wireless quality equal to or greater than a permission number, based on the order according to the wireless quality.

6. The resource allocation method according to claim 1, wherein, the wireless base station device collects wireless quality from the terminal device, allocates to the second time period the terminal device having the wireless quality equal to or greater than a wireless quality threshold, and allocates to the first time period the terminal devices having the wireless quality lower than the wireless quality threshold.

7. A wireless base station, comprising:
   a classification unit which classifies a plurality of wireless terminal devices into a first group and a second group according to wireless communication quality; and
   an allocation unit which performs allocation such that transmission time period allocated to wireless terminal device having the best wireless communication quality from among the wireless terminal devices belonging to the first group, and transmission time period allocated to the wireless terminal device having the best wireless communication quality from among the wireless terminal devices belonging to the second group, are temporally in closest proximity or overlap.

* * * * *